M B Knowles
Charles S. Winebarger
INVENTORS

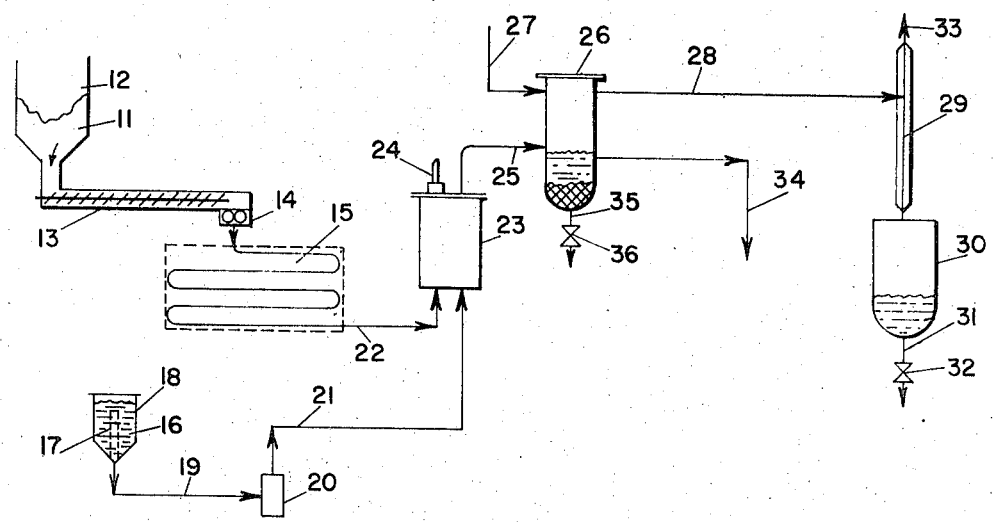
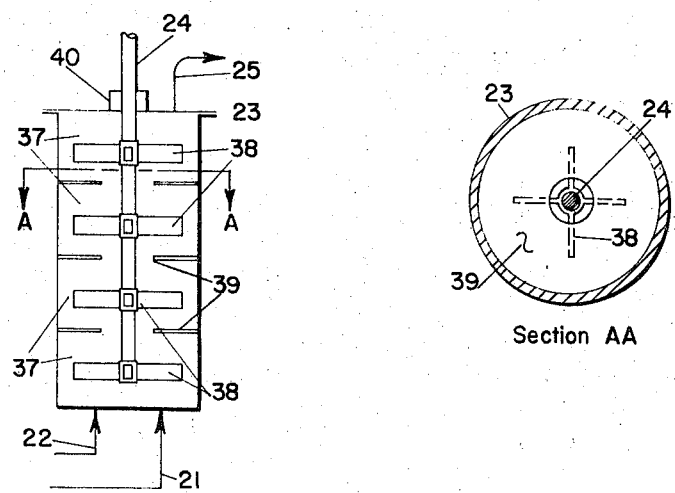

BY William J. French
Clyde L. Tootle
ATTORNEYS

United States Patent Office 3,642,722
Patented Feb. 15, 1972

3,642,722
PROCESS FOR PREPARING MODIFIED
POLYOLEFINS
M. B. Knowles and Charles S. Winebarger, Kingsport, Tenn., assignors to Eastman Kodak Company, Rochester, N.Y.
Continuation-in-part of abandoned application Ser. No. 643,872, June 6, 1967. This application Nov. 29, 1967, Ser. No. 691,099
Int. Cl. C08f 27/00
U.S. Cl. 260—78.4 D 15 Claims

ABSTRACT OF THE DISCLOSURE

A process for continuously introducing a mixture of low-molecular-weight polyolefin and an ethylenically unsaturated polycarboxylic compound, e.g. maleic anhydride, into an agitated, multistaged reaction zone in which the mixture is intimately mixed under conditions of essentially plug-type flow during the reaction. A high molecular weight polyolefin may be continuously, thermally degraded and introduced into the reaction zone while still hot, in lieu of employing a previously thermally degraded, low molecular weight polyolefin. An improved modified polyolefin product is separately recovered, while the unreacted polycarboxylic compounds may be recycled to the reactor for further conversion. The modified product, especially in the form of a thin film at an elevated temperature, is improved further by vacuum stripping, preferably at less than 10 mm. of Hg pressure. This novel improved product has a saponification number essentially all accounted for by acid groups chemically associated with the polymeric molecules.

This application is a continuation-in-part of Ser. No. 643,872, filed June 6, 1967, now abandoned.

This invention relates to a process for producing modified poly-alpha-olefin polymers having improved physical properties. More particularly, this invention relates to the modification of thermally degraded poly-alpha-olefins in a continuous manner. This invention also relates to novel modified polyolefins having a saponification number essentially all accounted for by acids groups chemically associated with the polymeric molecules.

It is known in the art to react poly-alpha-olefin compounds with polycarboxylic compounds. However, the teachings of the prior art are directed to forming higher molecular weight materials which may be more readily fabricated into shaped articles. These shaped articles may then be crosslinked under relatively mild conditions into high molecular weight plastics which are tougher than the uncured plastics. One such prior are teaching is directed to increasing the molecular weight and decreasing the melt index of polyethylene compositions by reacting polyethylene with maleic anhydride. These compositions have a higher molecular weight and are less soluble, probably due to crosslinking, then the unmodified polymeric material. Such prior art teachings therefore are directed to modifying poly-alpha-olefins to form higher molecular weight polymers which are more easily fabricated into useful articles of commerce.

Although maleated polyolefins such as maleated polyethylene as presently known have advantageous properties and utility, there is a need for even greater adhesion, essentially complete elimination of toxic by-products during utilization of melts over extended periods, and other improvements. Thus, for example, when coating a substrate such as fabric, there should be essentially no tendency to impart an odor to the substrate or fabric, therefore any residual acid, fumaric acid or maleic anhydride should be removed from the maleated polyolefin. Likewise, when coating a stereographically printed sheet there shouold be noo significant accumulation of noxious vapors affecting the personnel performing the coating operation.

Moreover, other properties are in need of greater improvement such as adherence to the article or object being coated.

These and other factors are improved upon by the present invention.

Accordingly, it is one of the object of the present invention to provide new and improved processes for preparing modified poly-alpha-olefin compositions.

An object of the invention is to provide processes for preparing emulsifiable poly-alpha-olefin compositions.

Another object of the invention is to provide emulsifiable poly-alpha-olefins by a novel process for reacting ethylenically unsaturated polycarboxylic compounds and thermally degraded poly-alpha-olefins in a continous manner.

Still another object of this invention is to provide emulsifiable poly-alpha-olefins by thermally degrading the unemulsifiable poly-alpha-olefins and thereafter reacting the thermally degraded polymer with ethylenically unsaturated polycarboxylic compounds in a continuous manner.

A further object of the invention is to provide a vacuum stripping process whereby improved modified poly-alpha-olefin compositions are prepared.

An additional object of the invention is to provide new and improve modified poly-alpha-olefin compositions having essentially no chemically unassociated acid residues.

A still further object of the invention is to provide high quality emulsifiable poly-alpha-olefins which are free from objectionable odor and body irritants and which will not discolor or undergo degradation.

Another object of the invention is to provide a continuous process for reacting - thermally degraded poly-alpha-olefins with polycarboxylic compounds without substantial decomposition of the polycarboxylic compounds.

Another object of the invention is to provide a continuous process for recovering unreacted polycarboxylic compounds for further use in the process.

These and other objects are accomplished by the practice of this invention which, according to one of its aspects, briefly comprises continuously introducing a low molecular weight polyolefin and an ethylenically unsaturated polycarboxylic compound, into an agitated, multi-staged reaction zone in which the low-molecular weight polyolefins and the ethylenically unsaturated polycarboxylic compounds are intimately mixed under conditions of essentially plug-type flow during their reaction. A high molecular weight polyolefin may be continuously, thermally degraded and introduced into the reaction zone while still hot, in lieu of employing a previously thermally degraded, low molecular weight polyolefin. The modified polyolefin product is separately recovered, while the unreacted polycarboxylic compounds may be recycled to the reactor for futher conversion.

According to another aspect of the invention, the thermal degradation of a high-molecular-weight polyolefin may be conducted in a degradation chamber which is similar in design to the reaction zone. In this case, the polymer to be thermally degraded is continuously introduced into an agitated, multistaged degradation zone in which the friction of mixing supplies essentially all of the thermal energy required for the degradation of the polymer.

According to still another aspect of the invention, a free radical initiator is employed in the reaction zone. The utilization of a free radical initiator in this manner permits lower reaction temperatures and results in a modified product having improved color.

According to a still further aspect of the invention, the modified product is vacuum stripped in a continuous manner for the removal of unreacted polycarboxylic compounds and other low boiling organic compounds. These low boiling compounds interfere with emulsification and are responsible for an objectionable odor in the modified product. In addition, stabilizers or antioxidants may be added to the modified polymers so as to produce a high quality product that will not discolor or degrade.

According to an additional aspect of this invention there is provided an improved maleated polyethylene having a melt viscosity in the range between about 1,000 and 100,000 cps. at 150° C. having a saponification number between about 2 and about 9, the numerical value of said saponification number being essentially all accounted for by acid groups chemically associated with the polymeric molecules of said maleated polyethylene.

According to another aspect of this invention such improved maleated polyethylene products can be provided by a process comprising forming a thin film preferably amout 1 to about 3 mm. thick of a maleated polyethylene having a saponification number between 3 and about 10 and having a melt viscosity in the range between about 1,000 and about 100,000 cps. at 150° C. and heating said film at a temperature in the range between about 50° C., and about 250° C. at a pressure less than about 10 mm. of Hg pressure until said improved product is produced.

Advantageously such a process is performed at a temperature in the range from about 100° C. to about 175° C. and said pressure is less than about 1 mm. of Hg pressure. Moreover, it is also advantageous to conduct such a process wherein the material in said thin film is maintained under said heat and range between about 1 second and 10 minutes.

A process as just described can readily be conducted wherein at least 25 pounds per hour of said improved product is produced, said product having a saponification number at least one unit less than that of the starting material being processed.

According to an aspect of this invention, improved maleated polyethylene as defined above is provided wherein less than 0.2 unit of said numerical value is accounted for by acid groups chemically unassociated with said polymeric molecules.

In the following description, several of the preferred embodiments of this invention have been set forth, but it is to be understood that they are given by way of illustration only and not in limitation thereof.

As previously mentioned, the ethylenically unsaturated polycarboxylic compound may be reacted with a low-molecular-weight polyolefin or, alternatively, a high-molecular-weight polyolefin may be continuously thermally degraded to a suitable molecular weight, and then passed to the novel reaction zone. Hence, the thermally degraded homopolymers and copolymers of ethylene, propylene, 1-butene, 4-methyl-1-pentene, 3-methyl-1-butene, 4,4-dimethyl-1-pentene, 3-methyl-1-pentene, 4-methyl-1-hexene, 5-ethyl-1-hexene, 6-methyl-1-heptene, 1-hexene, 1-heptene, 1-octene, 1-nonene, 1-decene, and the like may be suitably employed in the process of this invention. These homopolymeric or copolymeric crystallizable poly-alpha-olefins are prepared by conventional polymerization processes for preparing polymeric materials. For example, one such suitable polymer is the highly crystalline polypropylene prepared according to U.S. Pat. No. 2,969,345.

Thermal degradation of these homopolymers or copolymers, such as polypropylene, is accomplished by heating at elevated temperatures and rupture of the polymer chain apparently takes place at the points of chain branching of the polypropylene. The degree of degradation is controlled by reaction time and temperature to give a thermally degraded low-molecular-weight crystallizable polypropylene having a melt viscosity range from 250–5,000 cp. at 190° C. (ASTM–D1238–57T using 0.4±.0002 inch orifice) and an inherent viscosity of about .1 to .5. [Schulken and Sparks, Journal Polymer Science 26 277 (1957)]. The degradation may be carried out at a temperature of from about 290° to about 425° C.

The poly-alpha-olefin high-molecular weight polymers which are useful for purposes of this invention and may be degraded include those polymers characterized by an ultimate crystallizability of at least 80%. The carbon chains in these polymers appear to be substantially completely symmetrical in all planes. However, methods for determining the exact stereochemical nature or conformation of the asymmetric atoms in the chains of a given type of propylene polymer do not now exist. X-ray diffraction procedures, although useful in studies in the crystallographic unit cell structure and in estimating the degree of crystallinity, do not provide a means for establishing the steric structures of the polymer molecules or for determining their ultimate crystallizability. X-ray methods cannot be used to determine ultimate crystallizability because these methods fail to measure the contribution of small and imperfect crystallinities. The degree of crystallinity of a polymer has no significance per se as a measure of stereosymmetry in the polymer molecules. The degree of crystallinity of a given polymer varies with the thermal history or with the chemical environment to which the polymer is exposed. Therefore, we speak of a polymer as having an ultimate crystallizability. We determine this ultimate crystallizability by means of a thermodynamic method which measures the limiting melting point of the polymer. For example, polypropylene having a limiting melting point of 180° C., more preferably 183° C. or higher, has a remarkably high crystallinity (in terms of ultimate crystallizability) of about 80%. Processes which produce these highly crystalline propylene polymers yield gross polymer containing less than 20% by weight of heptane extractable material. Products which contain as much as 20% by weight of heptane-extractable material generally show a limiting melting point of about 177° C. as the result of a depression in the limiting melting point of the highly crystalline polymer present as a consequence of a mixed melting point effect. In fact, polypropylene polymers containing in excess of 99.5% of the heptane-insoluble polymer are obtainable directly from the reactor using the polymerization procedures set forth hereinafter. Crystallinity as used herein denotes the heptane-insoluble fraction of a propylene polymer expressed in weight percent, the heptane-insoluble fraction being the highly crystallizable polymer described hereinabove.

The low molecular weight or thermally degraded high molecular weight polyolefin is continuously reacted with an ethylenically unsaturated polycarboxylic compound. Suitable unsaturated polycarboxylic acids anhydrides and esters thereof for this purpose include maleic acid, maleic anhydride, fumaric acid, citraconic anhydride, aconitic anhydride, itaconic anhydride, dimethyl maleate, dimethyl fumarate, methyl ethyl maleate, dibutyl maleate, dipropyl maleate, etc. or those compounds which form these compounds at reaction temperatures such as citric acid, for example.

Suitable temperatures for the reaction of the polyolefin with the polycarboxylic compound include those in the range of between about 150° and about 400° C., and preferably between about 200° and about 325° C. The temperature is dependent upon the type of polyolefin, residence time in the reactor, amount of excess anhydride employed, degree of reaction required and whether or not a suitable catalyst, as hereinafter discussed, is employed. At the aforesaid temperatures the polycarboxylic compound is a gas or liquid with little solubility in the polyolefin. Therefore, intimate mixing is essentially to obtain faster reactions and to reduce degradaton of the polycarboxylic compound.

The reaction is advantageously conducted at atmospheric pressure. Accordingly, expensive high pressure equipment is not required. The contact time for the reaction can be in the order of about 10 minutes to about 2 hours and preferably from about 20 minutes to one hour.

While simultaneous thermal degradation and reaction of medium molecular weight polyolefins will occur at relatively high temperatures, about 300° to 450° C., the elevated temperature required for the polymer degradation results in excessive decomposition of the polycarboxylic compound. This excessive degradation is obviated by the sequential thermal degradation and reaction operations of the present invention.

In order to obtain modified polyolefins which form stable emulsions, acid numbers of 7 to 20 are required, depending upon the polyolefin and the emulsion composition. These acid number indicate the presnce of 0.6 percent to 1.8 percent reacted polycarboxylic compound, such as maleic anhydride. However, maleic anhydride in the liquid or vapor phase is only slightly soluble in the polyolefin. The reaction is rather slow, requiring, for example, about 30 minutes at 320° C. for obtaining acid numbers of 8 with polypropylene waxes. Therefore, effective mixing of the reactants is essential for an efficient reaction rate and to result in a modified polyolefin with an acid number greater than 6. The employment of the novel agitated, multistaged reactor of this invention results in the effective mixing required to produce maleated polyolefins with high acid numbers.

The agitated reactor employed in the process of this invention has still another advantage. At temperatures above about 300° C. the undesirable polymerization of the polycarboxylic compound, e.g. maleic anhydride, is favored. This product has a dark color and is insoluble in most common solvents. This polymer is therefore highly objectionable as it becomes dispersed in the modified polyolefin and will deposit on the inside walls of the process equipment. However, the employment of the agitated, multistaged reactor of the present invention substantially reduces the amount of this polymer that will form. The production of this material is inhibited to a large extent by good mixing, and contact times of less than one hour, both of which are achieved in the reaction zone of this invention. In addition, the amount of the undesirable polymer may also be reduced by employing concentrations of the polycarboxylic compound below 5 percent and temperatures under 300° C.

In the absence of vacuum stripping maleated poly-alpha-olefins generally containing at least about 0.1% maleic anhydride, maleic acid, fumaric acid or mixtures thereof in a chemically unassociated state. Of course, considerably higher or lower percentages may be present. Such a product, when in a molten form evolves small amounts of maleic or fumaric acid or anhydride and causes irritation to the eyes and mucous membranes of operating personnel over a period of time such as while using the product for coating paper. Such a product can be stripped very efficiently in a thin film evaporator such as Luwa evaporator or in a Kontro thin film evaporator to provide material having extremely low levels of maleic or fumaric acid and/or anhydride. The stripping operations are advantageously carried out at temperatures in the range of from 50 to about 250° C. at extremely low pressures. Pressures below 10 mm. of Hg such as on the order of 1 mm. Hg or less are suitable for this operation. The contact time is not critical but may be varied from as short a contact time as 1 to 2 sec. up to about 5 to 10 min. in the stripping apparatus. Thus, the throughput in the stripping operation is quite rapid and economical.

The invention will be further illustrated by reference to the accompanying drawings, wherein:

FIG. 1 is a schematic diagram illustrating the continuous process of this invention.

FIG. 2 is a vertical cross-sectional view of one type of reactor that may be employed in practicing the instant invention.

Figure 3:
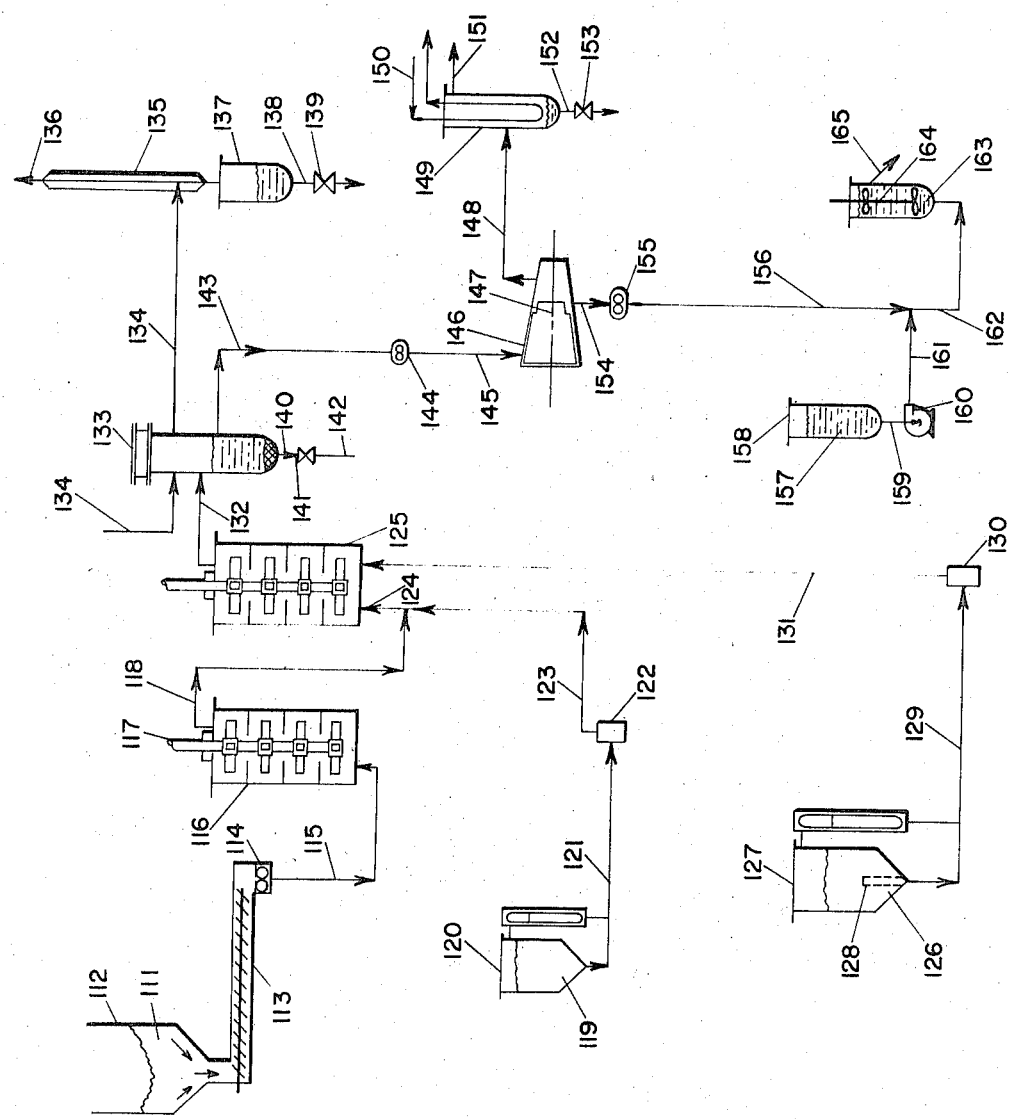
FIG. 3 is a schematic diagram illustrating various additional aspects of the continuous process of this invention.

Referring to FIG. 1 a solid, high molecular weight polyolefin 11, such as polypropylene is discharged from a storage tank 12 into a heated extruder 13, in which the polymer is continuously melted. The melt is metered by means of a pump 14 through a heated coil 15 wherein the polymer is continuously, thermally degraded to the desired low molecular weight. Meanwhile, a suitable ethylenically unsaturated polycarboxylic compound, such as liquid maleic anhydride 16 is passed through a filter 17 and is discharged from the storage tank 18 into a line 19 from which it is transferred by means of a pump 20 into a line 21 to the reactor. The filter 17 in storage tank 18 prevents unmelted maleic anhydride and other solids from passing into the line 19.

Thermally degraded polymer from the line 22 and liquid maleic anhydride from the line 21 are continuously introduced into the agitated, multistaged reactor 23 which has an agitator shaft 24, driven by a power source (not shown), where modification of the polyolefin occurs. The reactor 23 will be hereinafter discussed in greater detail. The polyolefin product is continuously removed from the reactor 23 and is transferred by means of the line 25 into a separator 26. An inert gas, such as nitrogen, may be metered into the separator 26 by means of a line 27 for the purpose of preventing air from entering the system and also serves to remove unreacted maleic anhydride from the separator 26.

Unreacted maleic anhydride vapors, nitrogen and other vapors are conducted from the separator 26 by means of a line 28 and are introduced into the condenser 29. The resulting liquid anhydride is collected in a tank 30 and may be removed via a line 31 and a valve 32 and thereafter recycled to the reactor 23 by a means not shown. Any uncondensed vapors are discharged from the condenser 29 by means of a vent 33.

The modified polyolefin product collects in a lower portion of the separator 26 and is discharged and recovered from a line 34. Any high density decomposition residue of maleic anhydride that is formed during the reaction will accumulate in the bottom of the separator 26 and may be drained through a line 35 and a valve 36.

A detailed cross-sectional view of a suitable reactor is shown in FIG. 2. Molten polyolefin and maleic anhydride are introduced into the bottom of the reactor 23 by means of the lines 22 and 21, respectively, and are intimately mixed in the first of four zones or stages 37 by means of agitator 38.

The reactor 23 has a series of stages 37 (four are shown in FIG. 2) each consisting of an agitator 38 and at least one baffle 39, which reduce backmixing of the reactants and assure a finite reaction time for all of the feed materials. The reaction proceeds continuously as the agitated, reacting polymer and maleic anhydride pass upwardly through each of the stages 37 under essentially plug-type flow conditions made possible by the reactor design.

The term "plug-type flow" as used in this specification is meant to describe the flow characteristics of the reactants as they pass through the reaction zone. The reacting mixture of polyolefin and polycarboxylic compound may be considered as comprising individual successive layers stacked one on top of the other in the reaction zone each of which is displaced by the next preceding layer. Thus, as a new layer of the polyolefin and unsaturated polycarboxylic compound is being introduced into the bottom of the reaction zone, a corresponding layer of modified polyolefin is continuously removed from the top of the reaction zone.

Effective mixing of the reactants is essential for an efficient reaction rate. Also, the decomposition of maleic anhydride is reduced in the presence of unsaturated compounds, such as the degraded polymer. Thus, effective agitation in a reactor, such as that shown in FIG. 2, reduces the amount of high-density decomposition residue of maleic anhydride that is formed during the reaction.

The modified polyolefin and the unreacted anhydride are discharged from the reactor 23 by means of the line 25 and are processed as was hereinabove described with respect to FIG. 1. The agitator shaft 24 is sealed by a sealing means 40, which prevents leakage of the reactor 23 to the atmosphere.

FIG. 3 illustrates additional aspects and modifications of the process of this invention. Referring to FIG. 3, a solid high molecular weight polyolefin 111 is discharged from a storage tank 112 into a heated extruder 113 and through a metering pump 114 as previously described in regard to FIG. 1. However, the molten polymer is passed by means of a line 115 to a thermal degradation chamber 116, instead of a heated coil, as before.

The thermal degradation chamber 116 is an agitated, multistaged unit which is of a design similar to the reactor 23 of FIG. 2. As previously mentioned, each thermal degradation step represents the breaking of a long chain polyolefin molecule, so that one of the consequent molecules has a new olefinic bond. Since the original polymerization from a pure monoolefinic monomer should have left one double bond per molecule, the thermally degraded polyolefin should contain an average of one double bond (potential reaction site) per molecule. The rate of thermal degradation is negligible up to a threshold temperature, about 320° C. for polypropylene, at which point the degradation rate becomes high and increases with increasing temperature. It is therefore desirable that the high molecular weight polymer be subjected to as uniform a degradation temperature as possible. This prevents over-degradation of the polymer to a molecular weight below that desired.

The agitator shaft 117 of the thermal degrader 116 is operated at a tip speed within the range of 13 to 44 feet per second and preferably 22 to 33 feet per second (by a motor not shown) in a manner such that essentially all of the thermal energy for the thermal degradation operation is supplied by the friction of mixing. This permits a more uniform temperature distribution throughout the polymer to be degraded than may be achieved by a heated wall degrader. The heated wall type of degraders inherently have a substantially decreasing temperature gradient away from the heated wall, which is the hottest part of the system. This causes non-uniform degradation of the polymer. The thermally degraded polyolefin is discharged from chamber 116 by means of a line 118.

According to still another aspect of the invention, a free radical initiator is employed to accelerate the rate of reaction of the polyolefin with the polycarboxylic compound and permit the use of lower temperatures for this reaction. Suitable free radical sources include, for example, peroxides such as ditertiary butyl peroxide, tertiary butyl hydroperoxide, cumene hydroperoxide, p-methane peroxide, p-menthane hydroperoxide compounds or azo compounds, such as azobis(isobutyronitrile), or irradiation sources. Suitable irradiation sources include, for example, those from cobalt, uranium, chromium, and the like and ultraviolet light. Preferably, about 1 to about 10% organic unsaturated polycarboxylic acid, anhydride or esters thereof, based on the weight of the low viscosity polyolefin, may be used in the process of the invention.

The amount of peroxide or free radical agent used is generally quite low being of the order of about 0.01 to about 0.5 percent based on the weight of the low molecular weight polyolefin.

Thus, a free-radical-initiator, 119, such as ditertiary butyl peroxide, which is dissolved in a suitable inert solvent such as heptane, is conducted from the storage tank 120 by means of a line 121, a metering pump 122 and a line 123 to the line 124, where the peroxide catalyst or initiator is admixed with the thermally degraded polyolefin. This admixture is introduced into the reactor 125 from the line 124.

Meanwhile, a suitable polycarboxylic compound 126, such as maleic anhydride is passed from the storage tank 127 through the filter 128 into a line 129, a metering pump 130 and a line 131 by means of which the liquid anhydride is continuously introduced into the reactor 125. The reaction is conducted in the manner previously described, except that the utilization of a catalyst permits the employment of contact times as low as about 10 minutes and up to about 2 hours. Additionally, the employment of a catalyst, such as a peroxide, allows the reaction to be carried out at lower temperatures which reduces the amount of polymer degradation that takes place in the reaction zone, and results in a modified product having an improved color.

The modified polymer and unreacted anhydride is removed from the reactor 125 by means of a line 132 and are introduced into separator 133. An inert gas is introduced into separator 133 by way of a line 134 and conducts any unreacted maleic anhydride vapors by means of a line 134 to a condenser 135. The uncondensed gases are vented by means of the line 136, while the liquified anhydride that collects in the receiver 137 may be discharged therefrom by means of a line 138 and a valve 139 and recycled to the reactor 125 for further reaction by a means not shown.

The high-density decomposition residue of the anhydride is discharged from the bottom of the separator 133 by means of a line 140, a valve 141, and a line 142. The modified polymer is removed from an intermediate portion of the separtor 133 by means of a line 143.

According to another aspect of the invention, the modified polyolefin from the line 143 is passed by means of a hot melt pump 144 and the line 145 to a thin-film evaporator 146 in which a high speed rotor 147 continuously spreads and agitates a film of the modified polymer on the wall of the evaporator cylinder. Among the suitable evaporators that may be utilized in the practice of this invention is a thin film evaporator such as that manufactured by the Rodney-Hunt Machine Company or the Kontro Company, Inc.

The vapors can be discharged from the evaporator 146 by means of a line 148 and are passed to a condenser 149, where a suitable heat transfer medium is circulated through pipe coil 150 to condense the vapors. A vacuum line 151 is attached to a suitable vaccuum source (not shown), such as a steam and/or water jet or a vacuum pump, for the purpose of maintaining a vacuum on the stripping system. The condensed low boiling materials are drained from the condenser 149 by means of a line 152 and a valve 153 and can be purified to recover the polycarboxylic compound. The polycarboxylic compound can be recycled to the reactor 125 by means not shown.

The highly purified, modified polyolefin is discharged from the evaporator 146 by means of the line 154 and is passed through a pump 155 and into the line 156.

A stabilizer or antioxidant can be continuously introduced into the purified, modified polymer so as to prevent the product from discoloring and degrading during storage, processing and/or the end use by the consumer. Suitable antioxidants include dilauryl 3,3'-thiodipropionate, tris(nonoylphenyl)phosphite, and 2,2'-methylene bis[6-(1-methylcyclohexyl)-p-cresol]. The antioxidants can be employed in an amount of between about 0.05 and about 0.5 percent by weight of the modified polymer.

Referring again to FIG. 3, a liquid stabilizer 157 is discharged from storage tank 158 by means of line 159 and a pump 160 and the stabilizer is introduced by line 161 to line 156 into the polymer stream. The modified polyolefin and stabilizer flow through the line 162 to a blending tank 163 which contains an agitator assembly 164. The finished polymer is discharged from the blending tank 163 by means of a line 165.

It will be seen from the foregoing description that the process of this invention is wholly continuous in all aspects. This invention can be further illustrated by the following examples of preferred embodiments. However, it will be understood that these examples are included merely for purposes of illustration and are not intended to limit the scope of the invention, unless specifically indicated. The percentages are by weight unless otherwise specified.

EXAMPLE 1

Previously degraded polypropylene having a viscosity of 3000 centipoises measured at 190° C. is passed from a feed tank and through a coil heated to 325° C. to a reactor, which is similar to that shown in FIG. 2, at a rate of 26 pounds per hour. One pound per hour of maleic anhydride is metered into the agitated reactor, which is maintained at a temperature of 325° C. A residence time of 30 minutes in the reactor is employed. The modified polypropylene and unreacted maleic anhydride are passed to a separator, and the polymer is removed from an intermediate portion of the separator.

The modified product has a viscosity of 1000 centipoises measured at 190° C. and an acid number of 8. This material emulsifies readily in water which is heated to a temperature of 160° C., while under pressure using potassium hydroxide and a suitable emulsifying agent. The resulting emulsion is stable at room temperature.

The unreacted maleic anhydride is passed from the separator to a condenser, where approximately 0.5 pound per hour of this material is recovered. When the anhydride is recycled to the reactor by way of a maleic anhydride feed tank, no change in the performance of the process or the quality of the product is detected. The separator is drained every 24 hours to remove maleic anhydride decomposition products, and this material amounts to less than 0.5 percent by weight of the total maleic anhydride feed.

The modified polymer product produced in the reactor of design similar to that of FIG. 2, also provides a process whereby the reactor is easily inspected and cleaned when necessary.

EXAMPLE 2

The previously degraded polyethylene having an approximate molecular weight of 1500 is passed from a feed tank, through a coil heated to 230° C. and then to a reactor similar in design to that shown in FIG. 2 at a rate of 19 pounds per hour. Meanwhile, 1.5 pounds per hour of maleic anhydride is introduced into the reactor which is operated at a temperature of 330° C. The residence time in the reactor is 41 minutes.

The modified polyethylene has an acid number of 20 and emulsifies readily in boiling water using potassium hydroxide as an emulsifying agent.

The following example is for comparative purposes and illustrates the problems encountered when the agitated, multistaged reactor of this invention is not employed.

EXAMPLE 3

Polypropylene, which is similar to that employed in Example 1 is melted in an extruder and fed at a rate of 12 pounds per hour along with 0.5 pound per hour of maleic anhydride to a reactor consisting of a coil of ⅜ inch diameter tubing. The residence time in the reactor is 30 minutes and the coil is maintained at 325° C.

When the coil is operated at atmospheric pressure, the resulting product forms a very poor emulsion. When a pressure of 200 to 400 p.s.i. is employed, the modified product forms a stable emulsion. However, in both instances a black, insoluble, nonemulsifiable material comprising 10 to 50 percent of the maleic anhydride fed to the reactor is formed from the decomposition of the anhydride. This charred polymer is very objectionable. Furthermore, the residual maleic anhydride causes spattering and irregular flow of the effluent polymer.

After the reaction of 900 pounds of polypropylene, the reactor tube is plugged by the precipitation of the maleic anhydride resin.

The following examples illustrate the continuous thermal degradation of high molecular weight polyolefins followed by the reaction of the resulting low molecular weight polymer with a polycarboxylic compound.

EXAMPLES 4–10

The equipment illustrated in FIG. 1 is operated to continuously thermally degrade high molecular weight polyolefins and then react the resulting low molecular weight polymer with maleic anhydride. The high molecular weight polyolefin is extruded at a rate of about 15 pounds per hour and the maleic anhydride is added to the bottom of the reactor at about 0.6 pound per hour. The thermal degradation coil is operated at a temperature between about 350° and about 400° C. to thermally degrade the polymer, while the reaction zone is operated at atmospheric pressure and at the temperatures indicated in the following table:

TABLE 1

| Example | Polyolefin | Reactor temperature (° C.) | Emulsifiability |
|---|---|---|---|
| 4 | Polyethylene | 300 | Good. |
| 5 | do | 325 | Excellent. |
| 6 | Polypropylene | 320 | Do. |
| 7 | Poly(1-butene) | 325 | Do. |
| 8 | Poly(4-methyl-1-pentene) | 325 | Do. |
| 9 | Copolymer, 90/10, Propylene/ethylene. | 310 | Good. |
| 10 | Copolymer, 80/20, Propylene/1-butene. | 320 | Excellent. |

The following example illustrates the employment of a stirred, multistaged thermal degrader in the continuous process of this invention.

EXAMPLE 11

High molecular weight polypropylene having an inherent viscosity of 1.5 is fed to a thermal degradation unit of a design similar to the reactor of FIG. 2 for an average contact time of 30 minutes. The thermal degrader is operated at a temperature of 370° C. with the agitator being operated at such a speed that essentially all of the thermal energy for degradation is supplied by the friction of mixing. The degraded polypropylene wax has a melt viscosity of about 800 centipoises measured at 190° C. This material is passed along with 3 percent by weight maleic anhydride to a reactor of design similar to the thermal degrader. The reactor is operated at a temperature of 300° C., and a contact time of 30 minutes is employed.

The resulting polymer product has an acid number of between 9 and 10 and has a better color than the samples that were reacted at higher temperatures. This modified polypropylene has a melt viscosity of about 700 centipoises measured at 190° C., so that a comparison with the 800 centipoises viscosity feed to the reactor indicates that very little polymer degradation occurs during the reaction.

The following example illustrates the employment of a peroxide catalyst in a continuous process.

EXAMPLE 12

A catalyst feed system and agitated thermal degrader similar to those shown in FIG. 3 is employed. The reactants and conditions of Example 11 are utilized except that the agitated reaction zone is maintained at 200° C. Ditertiary butyl peroxide in the amount of 0.25 percent by weight, based on the polypropylene feed rate, dissolved in a hydrocarbon solvent is continuously pumped into the bottom of the reactor along with the thermally degraded polypropylene wax and liquid maleic anhydride.

The modified product has a melt viscosity of 800 centipoises measured at 190° C., so that essentially no polymer degradation occurred in the reactor. This product has an acid number of 25 to 35, very good color, and forms an excellent emulsion, which is suitable for floor wax or textile finishing usage.

The following example illustrates the effects of omitting the catalyst of the previous example.

EXAMPLE 13

The equipment and reactants employed in Example 12 are utilized under the conditions set forth in Table II, and no catalyst is added to the reactor.

TABLE II

| | | |
|---|---|---|
| Contact time in degrader and reactor, min | 30 | 200 |
| Degrader temperature, ° C | 370 | 325 |
| Melt viscosity after degrader, centipoises | 800 | 800 |
| Reactor temperature, ° C | 200 | 200 |
| Product acid number | 1.5 | 3.3 |
| Product melt viscosity, centipoises | 725 | 700 |
| Emulsion stability of the product | Poor | Poor |

The acid numbers of the modified product set forth in Table II indicate that very little maleic anhydride add to the olefinic sites of the polypropylene in the absence of a peroxide catalyst. Thus, the noncatalytic reaction rate of maleic anhydride addition is very slow at 200° C. The catalyst of Example 12, ditertiary butyl peroxide, is selected because of its availability and stability to shock and heat. However, other peroxide catalysts or suitable free-radical-initiators accelerate the rate of reaction in a similar manner and are equally effective in achieving high acid numbers at lower temperatures.

The following example illustrates the production of a very high quality modified polymer product.

EXAMPLE 14

A continuous reaction and purification system which is similar to that shown in FIG. 3 is employed. Polypropylene having a melt viscosity of 700 centipoises measured at 190° C. is fed to the reaction zone at such a rate calculated to result in a reaction time of 23 minutes, while at a reaction temperature of 200° C. Similarly, 5 percent by weight maleic anhydride and 0.5 percent by weight ditertiary butyl peroxide dissolved in a hydrocarbon solvent, both based by weight on the polypropylene feed rate, are pumped to the reaction zone.

The modified product is continuously vacuum stripped to remove traces of maleic anhydride and low boiling hydrocarbons. The polymer product has a melt viscosity of 500 centipoises at 190° C., and a light color. Additionally, this product has a saponification number of 34.5, which indicates that over 3 percent of the maleic anhydride has reacted with the polypropylene.

The modified polypropylene forms an excellent emulsion which is suitable for textile finishes and floor waxes.

The following examples illustrate the importance of both agitation and maintaining essentially plug-type flow conditions in the reaction zone to insure the complete reaction of the polymer with the polycarboxylic compound.

EXAMPLES 15–20

Several portions of unmodified polypropylene having a melt viscosity of 700 centipoises measured at 190° C. are separately added to various amounts of the modified polymer that was produced in Example 14. The mixtures are individually granulated and then emulsified under pressure and at a temperature of 160° C., while employing 2.5 parts potassium hydroxide; 40 parts polymer; 10 parts nonionic emulsifier such, as for example, the condensation product of ethylene oxide and nonyl phenol, noe form of which is the commercial product sold as Dowfax 9N6; and 120 parts water.

The light transmittance through the emulsions is measured immediately after preparation, and again after standing two days. Also, the emulsions are observed for separation of non-emulsifiable polymer after standing for two hours. The results are set forth in Table 3.

TABLE III

| Example No. | Blend composition, wt. percent | | Light transmittance of emulsion, percent | | Separation of non-emulsified polymer after 2 hr. |
|---|---|---|---|---|---|
| | Modified polypropylene | Unmodified polypropylene | Initial | After 2 days | |
| 15 | 100 | ¹ 0 | 63 | 62 | None. |
| 16 | 99.5 | 0.5 | 64 | 51 | Slight. |
| 17 | 99 | 1 | 61 | 53 | More than Ex. 16. |
| 18 | 95 | 5 | 53 | 48 | More than Ex. 17. |
| 19 | 90 | 10 | 41 | 44 | More than Ex. 18. |
| 20 | 80 | 20 | 27 | 34 | More than Ex. 19. |

¹ Control.

As seen above, the control sample of 100% modified polypropylene forms an excellent, stable emulsion. However, with only one-half percent unmodified polypropylene present, some separation of polymer from the emulsion occurs.

By employing continuous agitation and essentially plug-type flow conditions in the reactor, there is sufficient contact between the polymer and the polycarboxylic compound, so that no portion of the polymer remains unmodified and the reaction is complete.

The emulsifiable modified low molecular weight poly-alpha-olefin compositions of this invention are useful for many purposes including laminating aluminum foil to kraft paper, as modifiers to improve the adhesion properties of petroleum waxes, and as aqueous emulsions such as, for example, providing scuff-resistant, hard glossy finishes or textile treating compositions which improve the scuff resistance of fabrics such as permanently creased cotton fabrics.

EXAMPLE 21

The non-emulsifiable modified polyolefins can be prepared, for example, by feeding polyethylene having a density of .908 (ASTM D–1505–57T) and a melt viscosity of 7,500 cp. measured by Brookfield at 150° C. and one percent, by weight, maleic anhydride to the maleation reactor shown by FIG. 3 at a temperature of 225° C. so that the polyethylene remains in the reactor for a period of 30 minutes. The modified polyolefin has an acid number of 5.0, excellent color, less than 0.1% residual maleic anhydride, and a melt viscosity of 7,499 cp. measured at 150° C. The product does not give off irritating vapors during subsequent processing conditions especially after it has been vacuum stripped. These modified polyolefins can be used as an additive to modify the physical properties of paraffin. A suitable formulation is 10% modified polyethylene and 25% ethylene/vinyl acetate copolymer blended in paraffin. This blend is useful for coating cartons to package frozen foods. The addition of the maleated polyethylene improves the adhesion of the blend to the carton, increases the gloss of the finished package, and improves the abrasion resistance of the coating material.

EXAMPLE 22

An amount of 150 pounds of maleated polyethylene is melted and charged to a Luwa evaporator at a melt temperature of 158° C. This maleated polyethylene product has a melt viscosity at 190° C. of 4,000 cps. and a saponification number of 4.66. The jacket temperature of the Luwa equipment is 161° C. The maleated polyethylene is passed through the thin film evaporator at the rate of 25 lbs./hr. and a contact time of about 8 minutes. The stripping is accomplished at a pressure of 100 microns. The melt temperature coming out of the stripper is 120° C. The molten polymer is quenched in water and then granulated. Stereographic pictures are coated with this stripped material without observing objectionable fumes after 1 hour or more. See Brunson and Douglas Ser. No. 685,957, filed on Nov. 27, 1967 for a disclosure of coating and embossing sterographically printed pictures, the disclosure of which is incorporated herein by reference.

Similarly good results are obtained when the process is performed in a Kontro thin film evaporator.

As already described above, maleated polyolefin is passed by means of a hot melt pump and a transfer line to a thin-film evaporator in which a high speed rotor continuously spreads and agitates a film of the maleated polymer on the wall of the evaporator cylinder. Among the suitable evaporators that may be utilized in the practice of this invention is a thin film evaporator such as that manufactured by the Rodney-Hunt Machine Company or the Kontro Company, Inc.

As also described above, the vapors can be discharged from the evaporator by means of a conduit and are passed to a condenser where a suitable heat transfer medium is circulated through a pipe coil to condense the vapors. A vacuum line is attached to a suitable vacuum source, such as a steam and/or water jet or a vacuum pump, for the purpose of maintaining a vacuum on the stripping system. The condensed low boiling materials are drained from the condenser.

The improved products of this invention have greater adhesion to paper, and other articles, are generally free of toxic constituents and produce improved stereographic sheets, coated carton stock for food products and other coated objects.

As described hereinabove, this invention consists of a novel process which comprises continuously, thermally degrading and modifying polyolefins in an agitated, multi-staged reactor under essentially plug-type flow conditions. However, many modifications may be made within the scope of the present invention without departing from the spirit thereof. For example, as alternatives to the polyolefin melting and metering equipment described above, an extruder may be employed without a gear pump, or a melt tank or tube may be used with a metering pump to feed the reaction zone. The degradation operation of this process is only necessary when it is desired to thermally degrade the polyolefin prior to reaction thereof. The reactor may be modified as to various agitator types and speeds, as well as to the number of stages. Additionally, two or more reactors and/or degraders may be used in series.

The methods of obtaining a modified polymer product and the recovery of excess maleic anhydride may be also modified. For example, the molten modified polyolefin may be metered through a heat exchanger to a suitable plastics processing machine such as a flaker, pelletizer, etc. The product may also be metered directly and continuously to equipment for formation of an emulsion of desired composition. The excess anhydride may be pumped continuously back to the reactor. In addition, all of the process lines and equipment should be either adequately insulated or externally heated, so as to maintain the polyolefin, polycarboxylic compound, and stabilizers in a liquid condition.

The invention has been described in detail with particular reference to preferred embodiments thereof, but it will be understood that variations and modifications can be effected within the spirit and scope of the invention as described hereinabove and as defined in the appended claims.

We claim:

1. A continuous process for producing modified polyolefins, which comprises reacting a low-molecular-weight crystallizable polyolefin with an ethylenically unsaturated polycarboxylic compound in an agitated, multi-staged reaction zone under essentially plug-type flow conditions, whereby, as a new increment of the polyolefin and unsaturated polycarboxylic compound is introduced into the bottom of the reaction zone, a corresponding increment of modified polyolefin is continuously removed from the top of the reaction zone, and recovering a modified crystallizable polyolefin having an acid number greater than the low-molecular-weight polyolefin.

2. The process of claim 1 wherein the low-molecular-weight polyolefin is produced by continuously thermally degrading a high molecular-weight polyolefin.

3. The process of claim 2 wherein the polyolefin is polypropylene.

4. The process of claim 1 wherein the ethylenically unsaturated polycarboxylic compound is maleic anhydride.

5. The process of claim 2 wherein the thermal degradation is conducted in an agitated, multizoned degradation zone.

6. The process of claim 1 wherein the modified polyolefin is passed to a separator for the separation therefrom of unreacted polycarboxylic compound, and at least a portion of the said unreacted polycarboxylic compound is recycled to the reaction zone.

7. The process of claim 1 wherein the modified polyolefin is vacuum stripped for the removal of low-boiling organic compounds including unreacted polycarboxylic compounds.

8. The process of claim 7 wherein at least a portion of the unreacted polycarboxylic compound is recycled to the reactor.

9. The process of claim 7 wherein the modified polyolefin is admixed with a stabilizer.

10. Improved maleated crystallizable polyethylene having a melt viscosity in the range between about 1,000 and 100,000 cps. at 150° C., having a saponification number between about 2 and about 9, the numerical value of said saponification number being essentially all accounted for by acid groups chemically associated with the polymeric molecules of said maleated, crystallizable polyethylene.

11. Maleated crystallizable polyethylene as defined by claim 10 wherein less than 0.2 unit of said numerical value is accounted for by acid groups chemically unassociated with said polymeric molecules.

12. A process for preparing an improved maleated crystallizable polyethylene product as defined by claim 10 comprising forming a thin film of about 1 to 3 mm. thick of a maleated crystallizable polyethylene having a saponification number between 3 and about 10 and having a melt viscosity in the range between about 1,000 and about 100,000 cps. at 150° C. and heating said film at a temperature in the range between about 50° C. and about 250° C. at a pressure less than about 10 mm. of Hg pressure until said improved product is produced.

13. A process as defined by claim 12 wherein said temperature is in the range from about 100° C. to about 175° C. and said pressure is less than about 1 mm. of Hg pressure.

14. A process as defined by claim 13 wherein the material in said thin film is maintained under said heat and pressure in the range between about 1 second and 10 minutes.

15. A process as defined by claim 14 wherein at least 25 pounds per hour of said improved product is produced, said product having a saponification number at least one unit less than that of the starting material being processed.

References Cited

UNITED STATES PATENTS

| | | | |
|---|---|---|---|
| 2,973,344 | 2/1961 | Fasce | 260—78.4 |
| 3,161,620 | 12/1964 | Perkins et al. | 260—78.4 |
| 3,341,622 | 9/1967 | Leibson et al. | 260—878 |
| 3,418,306 | 12/1968 | Guillet et al. | 260—94.9 |
| 3,433,777 | 3/1969 | Brunson | 260—88.2 |
| 3,481,910 | 12/1969 | Brunson | 260—78.4 |
| 2,766,214 | 10/1956 | Erchak et al. | 260—29.6 |
| 3,462,347 | 8/1969 | Chapman et al. | 203—6 |
| 3,261,391 | 7/1966 | Gudheim | 159—6 |

OTHER REFERENCES

Brunson, Def. Pub. of Ser. No. 828,807, filed May 26, 1969, continuation of Ser. No. 51,944 filed Jan. 10, 1966, published in 869 O.G. 713 on Dec. 16, 1969 (260—78.4).

JOSEPH L. SCHOFER, Primary Examiner

J. KIGHT, Assistant Examiner

U.S. Cl. X.R.

117—161 U Z